No. 723,339. PATENTED MAR. 24, 1903.
J. P. TOLMAN.
COUPLING FOR CORDS OR ROPES.
APPLICATION FILED OCT. 15, 1902.
NO MODEL.
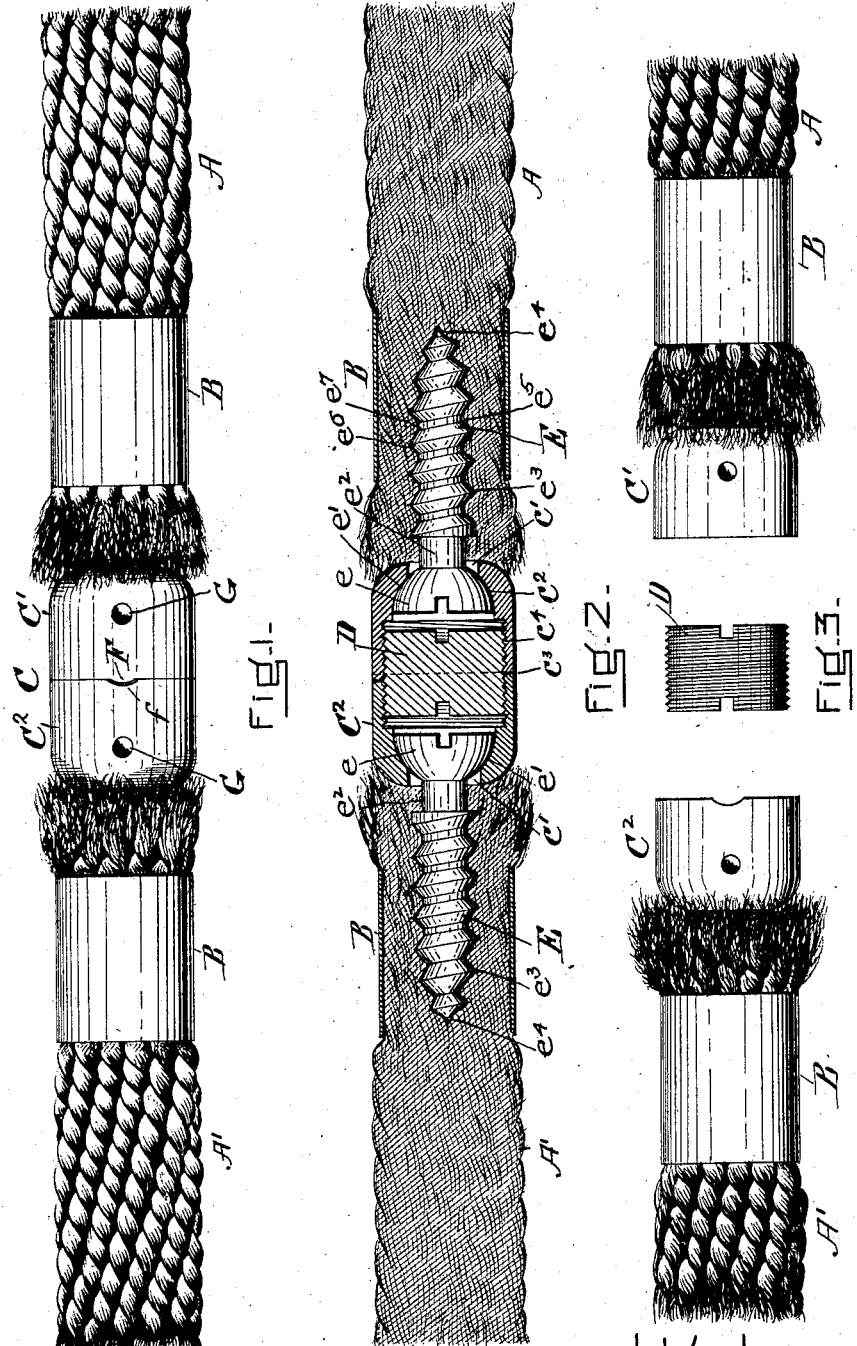

UNITED STATES PATENT OFFICE.

JAMES P. TOLMAN, OF NEWTON, MASSACHUSETTS, ASSIGNOR TO SAMSON CORDAGE WORKS, OF BOSTON, MASSACHUSETTS, A CORPORATION OF MASSACHUSETTS.

COUPLING FOR CORDS OR ROPES.

SPECIFICATION forming part of Letters Patent No. 723,339, dated March 24, 1903.

Application filed October 15, 1902. Serial No. 127,334. (No model.)

*To all whom it may concern:*

Be it known that I, JAMES P. TOLMAN, a citizen of the United States, and a resident of Newton, in the county of Middlesex and State of Massachusetts, have invented a new and useful Improvement in Couplings for Cords or Ropes, of which the following is a full, clear, and exact description, reference being had to the accompanying drawings, forming a part of this specification, in explaining its nature.

The invention relates to a coupling for connecting the ends of cords and ropes. It is adapted especially for use in connection with cords and ropes used for the transmission of power; but I do not confine myself to such use. Its construction is such that it does not materially increase the diameter of the cord or rope of which it forms a connecting part and does not materially decrease its flexibility, the coupling being constructed in such a manner as to possess in and of itself a universal flexibility or power to conform to the various curvatures of a cord or rope in, for instance, passing over pulleys.

It comprises two cylindrical sections, practically counterparts, adapted to be united together by a plug and each of which has at its end a cavity surrounding a central hole, the cavity being adapted to receive the head of a fastening-screw of peculiar construction, which secures its section of the coupling to the end of the cord, and the hole being of such size compared with the neck of the screw as to permit the screw to be turned or swung with its head for a center and with respect to the coupling and in any direction. Each of the fastening-screws is adapted to screw into the end of a rope or cord, which is prevented from spreading by means of metal sleeves or ferrules.

I will now describe the invention more in detail in connection with the drawings forming a part of the specification, wherein—

Figure 1 is a view in plan of two ends of a cord or rope and connecting coupling. Fig. 2 is a view principally in vertical central section thereof. Fig. 3 is a view representing the two members of the coupling before attachment by the screw-plug.

Referring to the drawings, A represents an end of a piece of cord or rope, and A' represents the other end of the same piece or the end of another piece. Each end is bound by or inclosed in a metal sleeve or ferrule B, which fits closely upon it.

C is the coupling, composed of the member C' and the member $C^2$. Each member is cylindrical in form, having its outer end rounded and provided with a hole $c'$, extending from the chamber $c^2$. Each member also has extending from its end $c^3$ an interior screw-thread $c^4$. The plug D has an exterior thread which screws upon the interior screw-thread of both members, the plug forming a rigid means of uniting the two members together with their ends $c^3$ in contact with each other and with the cylindrical sections of the members in line with each other. The plug is provided with slots at either end to facilitate its being driven by a screw-driver or like means, as occasion may require. The plug is removable from the members to permit the screwing of their attaching-screws E into the ends of the cord or rope to which they are secured. These screws are alike. Each has a head $e$, held in the chamber $c^2$ of its member and having the hemispherical back $e'$, which in conjunction with the inner surface of the part of the member surrounding the hole $c'$ forms, in effect, a ball-joint, the hemispherical back swinging in every direction from such surface. The screw also has a neck $e^2$ adjacent to the head, which is considerably smaller than the hole $c'$, through which it passes, and also considerably smaller than the thread $e^3$ of the screw, which begins at the end of the neck and which ends in a gimlet-point $e^4$. The thread is quite thick at its base $e^5$, thereby presenting a blunt facing, but with a relatively sharp biting edge $e^6$, and is separated by a considerable space $e^7$ for the purpose of permitting it to be screwed into the end of the cord or rope within the metal sleeve B to compress it against the sleeve and into the spaces between the threads, but not to cut or injure the fibers of the strands of the cord or rope. The attaching-screw of each member is accessible through its inner end, and each screw is screwed into the end of its piece or part of the cord or rope and within the part thereof contained by the sleeve B. The members are then screwed upon the plug D, and the two ends of the cord or rope or pieces thereof are thus coupled together. To prevent the members from unscrewing from the plug D, there is formed in the end of one member one or more depressions $f$, (see Fig. 1,) into which locking portions F of the other member may be forced or driven, so as to form a lock after the parts are screwed together. The members may also have one or more holes G arranged near their outer ends and opposite the hemispherical backs of the screws, through which a lubricant may be fed to the bearings and which also serve as wrench or spanner holes.

It will be seen that the connection between the rope or cord ends and the coupling is of such a nature that the rope or cord may be easily turned in any direction from the coupling, and thus may be curved or bent to easily conform to any direction in which it may be caused to travel, and this without sacrifice of strength in the coupling and without practically enlarging the diameter of the cord or rope.

I do not confine the invention to the form of attaching-screw shown, as any form of screw having a neck enough smaller than the hole in coupling end may be used.

Having thus fully described my invention, I claim and desire to secure by Letters Patent of the United States—

1. A coupling for uniting in line with each other the ends of cords or ropes consisting of two members secured to each other and an attaching-fastener for each member, making interior connection with the rope end and having provision for universal movement in its connection with its coupling member, as and for the purposes set forth.

2. The rope or cord end coupling herein described, the same comprising cylindrical members having chambers at their outer ends with holes extending from them, attaching-screws the heads of which are contained in said chambers, the necks of which extend through the holes and are considerably smaller than said holes and the threads of which are adapted to make engagement with the cord or rope ends, and a coupling-plug connecting the two members, all as and for the purposes described.

3. The combination of rope or cord ends, a sleeve tightly confining each end, screws screwing into said ends within the portions contained by the sleeves and having their heads extending from said ends and shaped to form portions of coupling-bearings, with a coupling member loosely mounted upon each screw-head to swivel thereon, and a coupling-plug adapted to unite the two coupling members.

4. In a coupling of the character specified the two coupling members, their attaching-screws fastening into the ends of the rope and with the heads of which screws the two said corresponding members of the coupling are adapted to have universal movement, and a coupling-plug common to both of said members and adapted to rigidly secure them together.

5. In a coupling of the character specified, the two members secured together, their attaching-screws with the heads of which the members have a swiveling connection, and a hole in each member adjacent to the screw-head and giving access thereto as and for the purposes set forth.

JAMES P. TOLMAN.

In presence of—
F. F. RAYMOND, 2d,
SAUL SIPPERSTEIN.